3 Sheets—Sheet 1.
A. W. WOODWARD.
Pump.
No. 222,116. Patented Nov. 25, 1879.
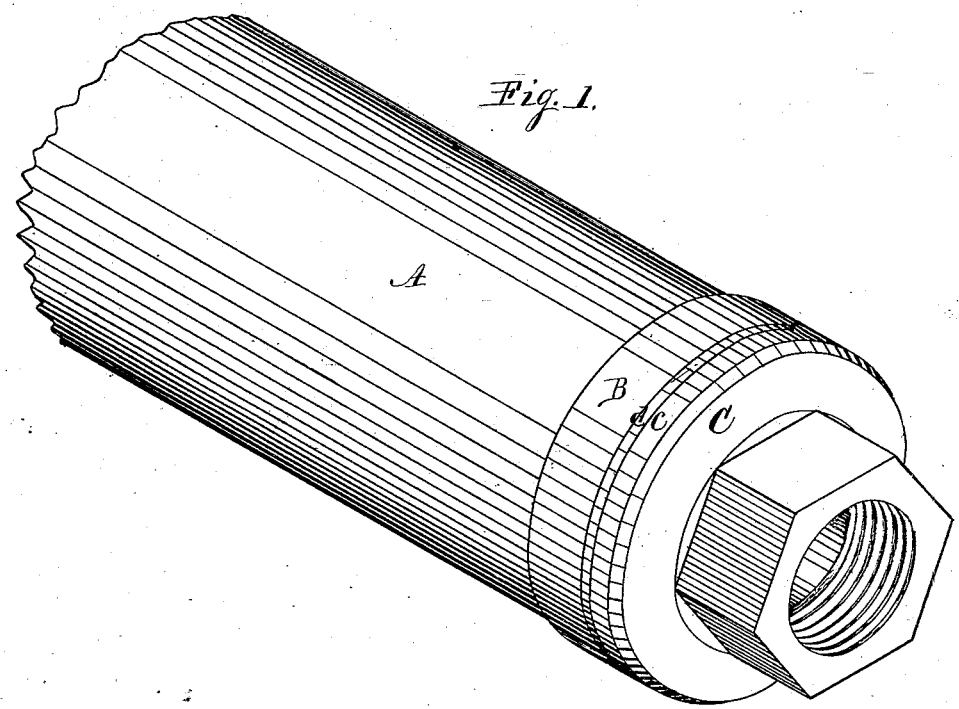
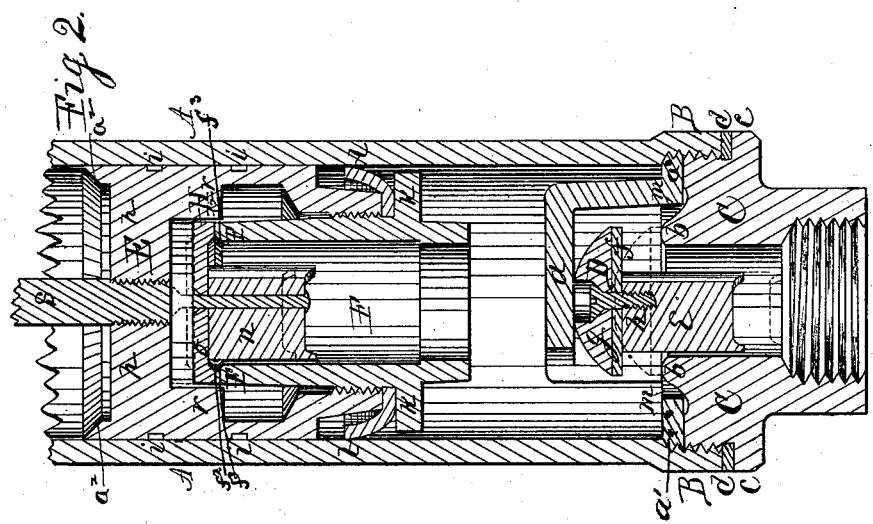
Attest.
A O Behel
John Nelson
Inventor
Amos W. Woodward,
Per Jacob Behel
Atty.

A. W. WOODWARD.
Pump.

No. 222,116. Patented Nov. 25, 1879.

Attest,
A. O. Behel
John Nelson

Inventor
Amos W. Woodward,
Per Jacob Behel
Atty

A. W. WOODWARD.
Pump.

No. 222,116. Patented Nov. 25, 1879.

Attest,
A. D. Behel
John Nelson,

Inventor
Amos W. Woodward
Per Jacob Behel
Atty

N. PETERS, PHOTO-LITHOGRAPHER, WASHINGTON, D. C.

UNITED STATES PATENT OFFICE.

AMOS W. WOODWARD, OF ROCKFORD, ILLINOIS.

IMPROVEMENT IN PUMPS.

Specification forming part of Letters Patent No. 222,116, dated November 25, 1879; application filed March 10, 1879.

*To all whom it may concern:*

Be it known that I, AMOS W. WOODWARD, of the city of Rockford, in the county of Winnebago and State of Illinois, have invented a new and useful Improvement in Pumps, of which the following is a specification.

This invention relates to pumps of that class mainly employed to raise water from wells and cisterns and for other like purposes. It, however, relates more especially to the valves and their connection with the pump-cylinder and with the plunger employed in the cylinder.

The invention consists in the parts and combination of parts hereinafter described and claimed.

In the accompanying drawings, Figure 1 is an isometrical representation of a pump-cylinder embodying my invention, of which Fig. 2 is a lengthwise central section. Fig. 3 is a plan view of the lower valve-seat. Fig. 4 is a plan view of the plunger. Fig. 5 represents the leather-ring packing of the plunger. Fig. 6 is a plan view of the plunger-valve seat. Fig. 7 is a plan view of the lower valve-yoke. Figs. 8 to 19, inclusive, relate to the method of constructing and finishing the chilled valve-seat and the chilled valve, which will be hereinafter more fully explained.

In the several figures, A represents a pump-cylinder, which is bored and polished, as common in this class of pumps. The lower end portion of this cylinder is enlarged, as at B, which produces an offset or shoulder on the lower end of the main cylinder on the inside of the enlargement. This offset or shoulder furnishes a bearing, against which the valve-yoke is supported in the cylinder.

$a$ is the yoke employed to limit the upward movement of the valve. Its base $a'$ is of ring form and of greater diameter than the main cylinder, and is fitted to rest against the offset or shoulder formed at the junction of the enlargement with the main cylinder, and in this instance its outer edge is screw-threaded to enter the screw-threaded enlarged portion of the cylinder. This screw-thread, however, is not an essential feature in this construction, as it is evident that the yoke may be held in position above the valve-seat portion by its enlargement resting against the shouldered lower portion of the main cylinder.

C is the lower valve-seat portion of the pump, of which $b$ is the valve-seat, raised above its main upper surface, which, when in place, forms a sediment-chamber, $m$, between the valve-seat and the base-ring of the yoke. This base portion is constructed with an outward-projecting flange, $c$, above which this lower portion is screw-threaded to enter the screw-threaded enlargement of the cylinder.

$d$ is a ring-packing, made from any suitable material, and is placed between the flange $c$ and the lower end of the cylinder, which, when the parts are firmly screwed together, forms a water-tight joint, and the yoke, having been previously inserted above the seat, will be held in place against the shoulder of the main cylinder. This lower portion, C, is provided with a vertical central opening to admit the water into the cylinder over the valve-seat.

D represents a puppet-valve, composed of parts, of which $e$ represents the vertical guiding-shaft, which is of the usual wing or bayonet form, on which rests the packing-disk $f$, held to the shaft by the metallic cap $g$, fixed in place by the screw $h$. These parts constitute the lower valve, which rests on the valve-seat $b$, and is limited in its upward movement by the yoke or cage $a$. This valve is shown in solid lines in an elevated position, and in dotted lines at rest on the valve-seat $b$. This wing or bayonet formed guiding-shaft $e$, when the valve is raised, permits the water to pass upward through the central opening of the portion C and flow over the valve-seat. The lower end of the lower valve-seat portion C is provided with a screw-threaded portion to receive the screw-threaded end of the pipe which puts the pump in connection with the water.

E represents a tubular plunger, fitted to play up and down in the cylinder, and is provided with annular water-packing grooves $i$. The lower portion of the tubular plunger is reduced on its outside to admit of a suitable packing-ring, and its inner surface is screw-threaded to receive the screw-threaded portion of the raised valve-seat.

F is a raised valve-seat portion, provided near its lower end with an outward-projecting flange, $k$, above which it is screw-threaded to enter the screw-threaded lower portion of the plunger.

$l$ is a packing-ring, made of any suitable material, and is placed between the flange $k$ and the lower end of the plunger, which, when the parts are screw-threaded together, will form a water-tight joint, and the reduced lower portion of the plunger will permit the outer edge of the packing-ring to turn upward, to insure a close fitting thereof against the inner surface of the cylinder during the ascent of the plunger. This valve-seat portion of the plunger is of tubular form, and rises in the central opening of the plunger, forming a sediment-chamber between it and the inner walls of the plunger. The upper portion of this raised valve-seat is cast on a chill, to produce a chill-hardened valve-seat to make it more durable. The inner surface of this raised tubular portion and its upper face end, forming the valve-seat proper, $f^2$, is ground to produce a smooth and even surface.

H is the puppet-valve in the plunger, and in this instance is composed of two parts—the vertical grinding-shaft $n$, which is of the usual wing or bayonet form, and the cap $o$, fixed thereto by a central rivet. In this instance the cap $o$ is cast on a chill to produce a chill-hardened valve, and its under wearing-surface is ground to come in contact with the ground surface of the chilled valve-seat, by which I produce a pump capable of a greater amount of service than pumps constructed in the usual manner.

The upper portion of the plunger is provided with transverse bars $p$, which radiate from a central hub, which is provided with a central axial hole, screw-threaded to receive the screw-threaded lower end of the plunger-rod $s$, by which to connect the plunger with the operating device.

$r$ represents guideways, which project from the inner walls of the plunger, and serve to give direction to the vertical movement of the valve-cap. These guideways, in connection with the radial arms, serve as a yoke to give direction to and limit the vertical movement of the valve.

The portion of the plunger above the radial arms is beveled inward, as shown by $a^2$, which serves to collect the sediment from the inner surface of the cylinder. In this instance the central portion of the chilled cap is recessed or sunk below the plane of its bearing-surface, which reduces the surface to be ground, and enables me to produce a better-fitting valve with less labor and care than can be done with an even-faced valve. This valve is represented in section in place in Fig. 2, and is also represented in section at Fig. 14, and its lower end view is shown at Fig. 12.

In the foregoing I have represented my improved chilled valve as composed of two parts, in which the chilled under surface of the cap can be readily ground on an ordinary face-grinding wheel; and if the bearing-edges of the winged shaft are chilled they may also be ground on an ordinary grinder, after which they may be joined in any suitable manner, and thus produce a valve having chilled wearing-surfaces.

At Fig. 8 I have represented in a vertical central section a method of casting my improved chilled valve in one piece, having a recessed under face, and chilled bearings both on the cap and shaft. This I accomplish by means of a chill, $t$, of tubular form, of proper size to receive the shaft of the valve, and its end of proper form to give conformation to the cap. This chill, with the pattern in place, is embedded in molding-sand, molded, and the valve cast in the chill, from which the cast is drawn when cold. Its bearing-surfaces are then ground, which is readily accomplished in the manner represented in Fig. 9, in which K represents a tubular grinder, which may be fixed, by means of its base-plate or otherwise, to a revolving mandrel or face-plate, and having its tubular end adapted to receive the valve H, which, if held in contact with the revolving tubular grinder, will soon be reduced to a working-surface.

Another method of grinding these valves is represented at Fig. 13, in which L represents a portion of an ordinary beveled-edge grinding-wheel. This method will be understood from the figures without further explanation.

At Fig. 10, N represents the chill in which the upper end of the raised valve-seat F is cast, and is of proper form to give conformation to the seat, which, in this instance, is formed with its inner angle beveled to allow for accidental imperfections that may exist on the working-face of the valve. This chill, in connection with the pattern of the valve-seat portion, is embedded in molding-sand, and the valve-seat is cast in the mold thereof in contact with the chill which gives form to and chills the valve-seat proper, which, when it is removed from the mold, may be ground in the manner represented in Fig. 11, in which P represents the grinder, which is made to revolve while the valve-seat F is held in contact with its revolving surface, by which it is ground to proper form.

At Figs. 15 and 16 I have represented a method of casting my improved chilled valve, in which Fig. 16 is a plan view of the chill employed, and Fig. 15 is a vertical central section of the chill on dotted line X, and in which the valve is shown in section. In these figures, $t$ represents the chill, which is of tubular form, having its upper end of proper form to give the proper conformation to the under face and outer edge of the valve-cap, and its inner upper edge is provided at proper intervals with inwardly-projecting V-formed prominences, as at $v$, which are employed to produce V-formed notches in the outer edge of the wings of the valve-shaft $n$, as at $u$, immediately under the cap $o$. In producing these chilled valves the pattern is inserted in the chill with the wings of its shaft between the prominences $v$, and when the cap rests on the chill it is then turned until the notches in the wings receive the V-formed prominences of the chill. These parts are then molded in the usual manner and withdrawn from the same. The pattern is then turned in the chill and removed therefrom, the chill returned to the mold, and the valve cast in the usual manner, after which, when cooled, the cast is removed from the chill in the usual manner. The working-face of this valve may then be ground on an ordinary beveled-edge grinder, as represented at Fig. 17, in which L represents a section of the grinding-wheel.

Figure 4:
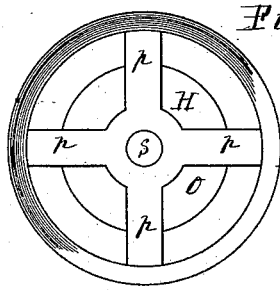
Figure 3:
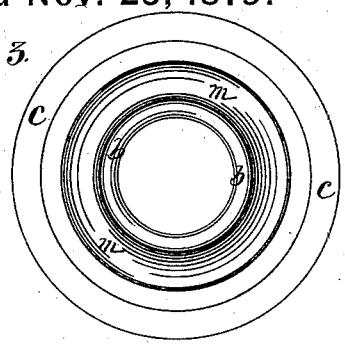
Figure 5:
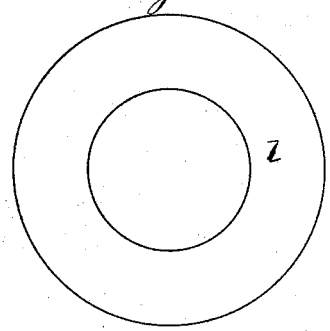
Figure 6:
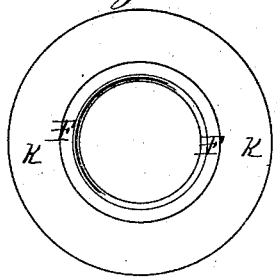
Figure 7:
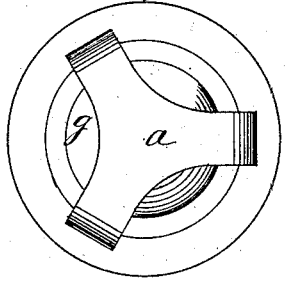
Figure 8:
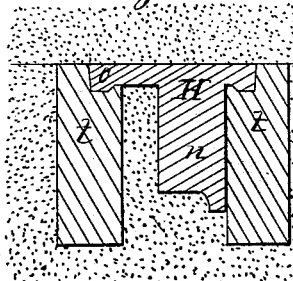
Figure 9:
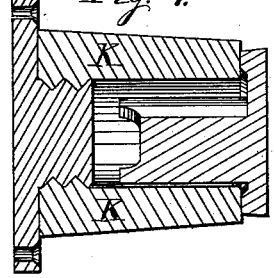
Figure 10:
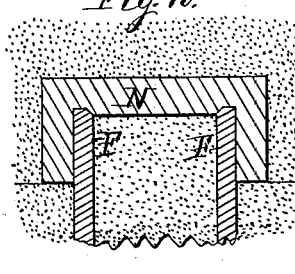
Figure 12:
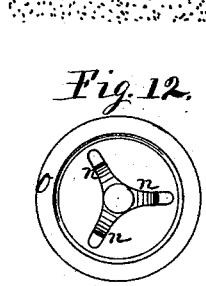
Figures 13, 14:
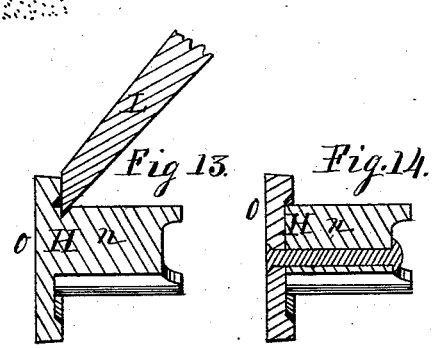
Figure 11:
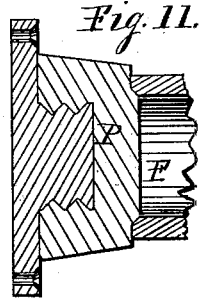
Figure 15:
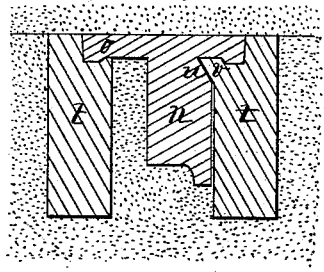
Figure 16:
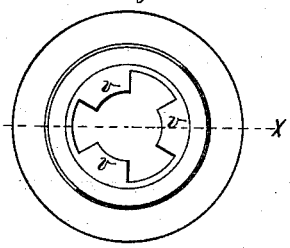
Figure 17:
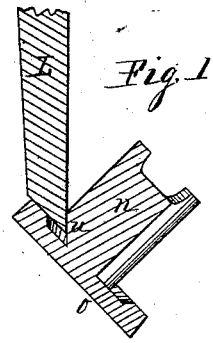
Figure 18:
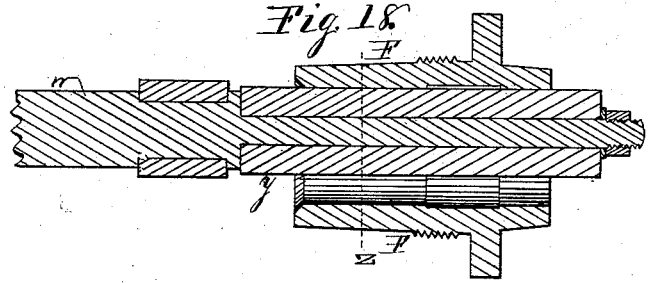
Fig. 18 is a lengthwise central vertical section of a roll-grinder, in which $w$ represents a mandrel fitted to revolve in suitable bearings, and on which is mounted the roll-grinder $y$, employed to grind the inner surface of the chilled tubular valve-seat F.
Figure 19:
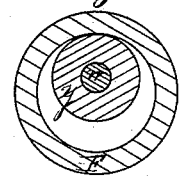
Fig. 19 is a transverse section of the roll-grinder and of the tubular valve-seat, taken on dotted line Z. In the use of this grinder the tubular valve-seat is passed onto the revolving grinder, and held in contact therewith loosely to permit it to turn slowly on the revolving grinder, by which they are readily reduced to a proper surface.

By my method of constructing chilled valve-seats and chilled valves successful pumps may be constructed without grinding the chilled wearing-surfaces.

I have represented certain methods of grinding the chilled wearing-surfaces; but it is evident that other known methods of grinding may be employed without departing from the main features of my invention.

I claim as my invention—

1. The combination, with cylinder A, formed with the annular shoulder B, whose inner side is screw-threaded, of the valve-seat portion C, formed with the outwardly-projecting annular flange $c$, and the ring-packing $d$, interposed between said shoulder and flange, the outer side of said portion C, above its flange, being screw-threaded and engaging with the cylinder screw-thread, substantially as set forth.

2. The combination, with cylinder A, formed with the annular shoulder B, whose inner side is screw-threaded, of valve-seat portion C, having the annular outwardly-projecting flange $c$, the ring-packing $d$, interposed between the flange and shoulder, and the ring-base $a'$ of the yoke $a$, fitted directly between said shoulder and the valve-seat portion, said flange and ring-packing being located below the screw-thread engagement of the cylinder and valve-seat portion, substantially as set forth.

AMOS W. WOODWARD.

Witnesses:
A. O. BEHEL,
THOMAS FERGUSON.